United States Patent [19]

Davis et al.

[11] 3,773,987
[45] Nov. 20, 1973

[54] CABLE RETRACTOR
[76] Inventors: Raymond Davis, 13942 Brenan Way, Santa Ana, Calif. 92705; Poul B. Roulund, 24052 Gemwood Dr., El Toro, Calif. 92630
[22] Filed: Feb. 7, 1972
[21] Appl. No.: 224,142

[52] U.S. Cl. ............................................. 191/12.4
[51] Int. Cl. ........................................... H02g 11/02
[58] Field of Search ................... 137/355.16, 355.2, 137/355.23; 191/12.2 R, 12.2 A, 12.4; 242/107, 107.1, 107.13, 107.2, 107.6, 115, 116

[56] References Cited
UNITED STATES PATENTS

| | | | |
|---|---|---|---|
| 3,657,491 | 4/1917 | Ryder | 191/12.2 R |
| 742,398 | 10/1903 | Donahue | 191/12.2 R |
| 2,007,699 | 7/1935 | Wiebking | 191/12.2 R |

*Primary Examiner*—Gerald M. Forlenza
*Assistant Examiner*—D. W. Keen
*Attorney*—John T. Matlago

[57] ABSTRACT

An electrical cable retractor is provided with a reel on which a length of electrical cable is attached and wound in such a manner as to permit the inner end of the cable to remain fixed to a stationary drum on which the reel rotates while the outer portion of the length of cable is wound on or unwound from the reel. The electrical cable stored on the reel of the retractor is thus permitted to be connected to a power source without the need of brushes and slip rings. A spring motor is provided on the retractor for reversely rotating the reel so that the portion of the length of cable that is withdrawn from the retractor is maintained taut at all times.

7 Claims, 9 Drawing Figures

PATENTED NOV 20 1973　　　　　　　　　　　　3,773,987
SHEET 1 OF 2
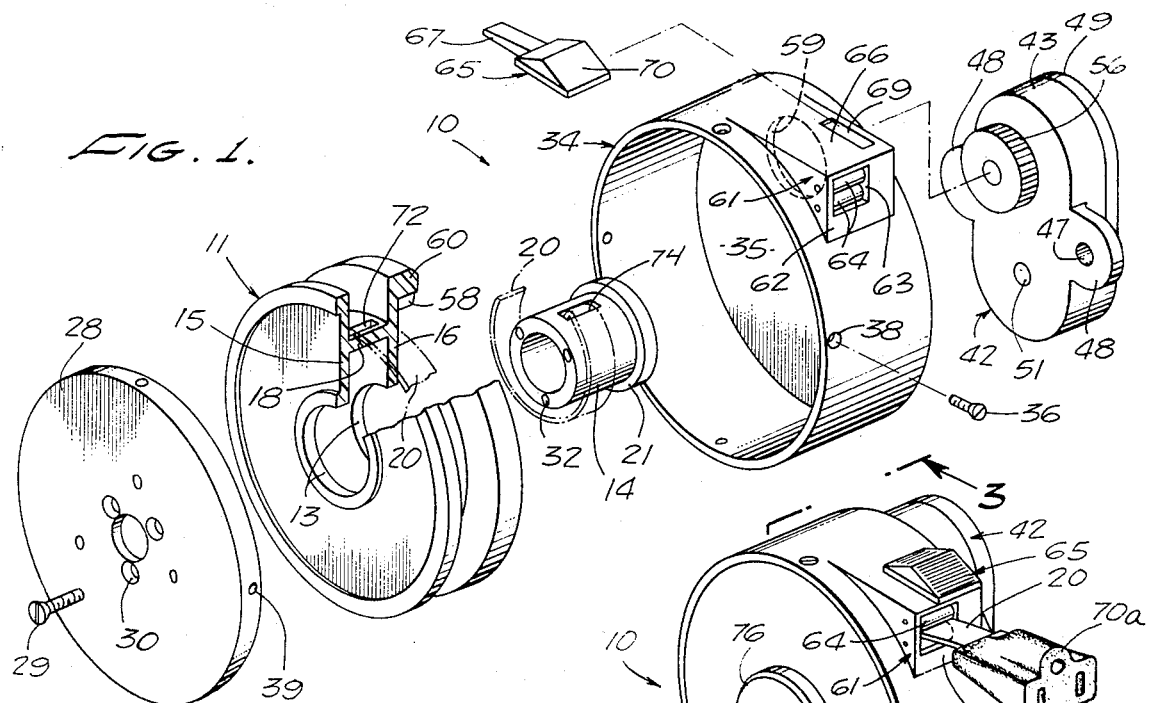
FIG. 1.
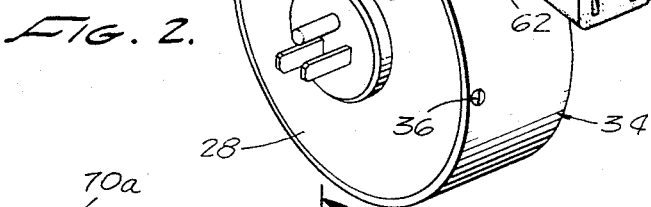
FIG. 2.
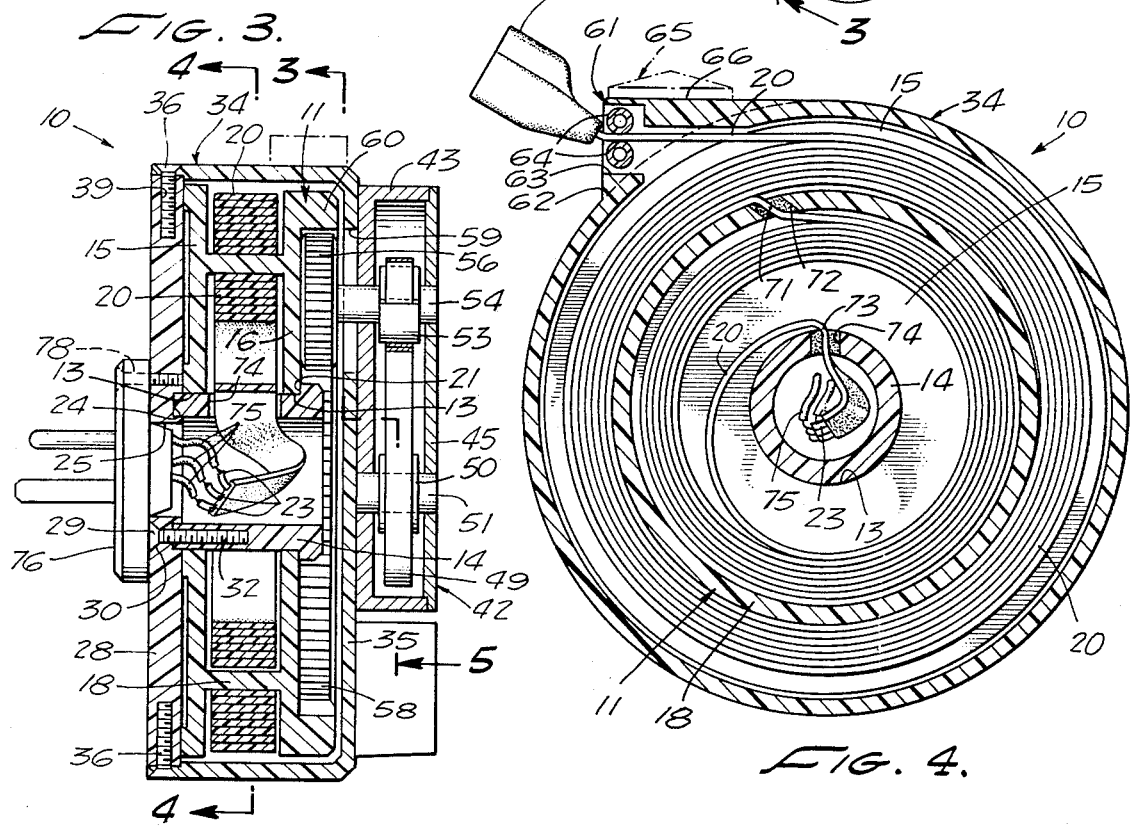
FIG. 3.
FIG. 4.

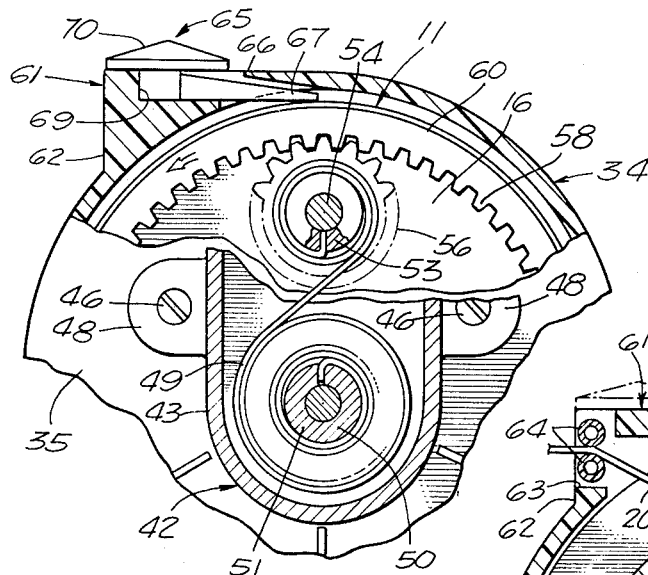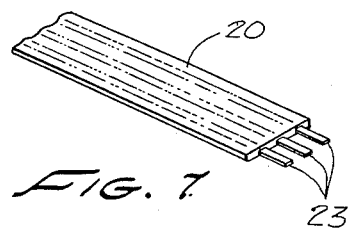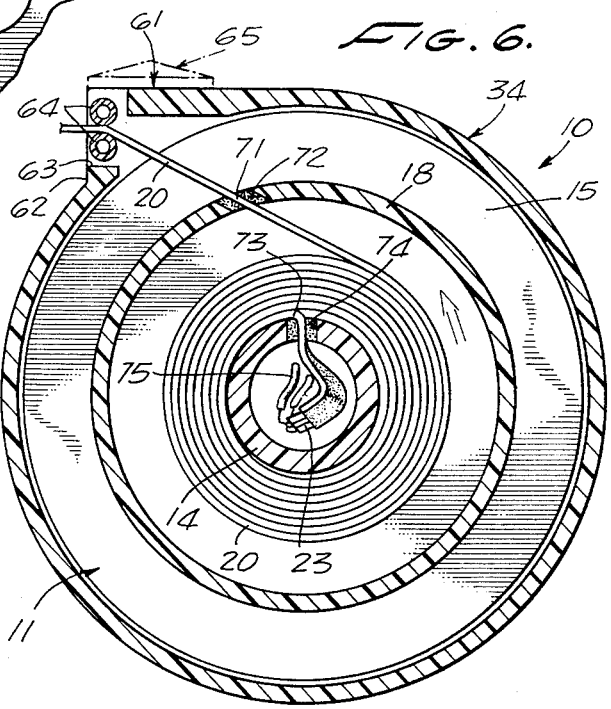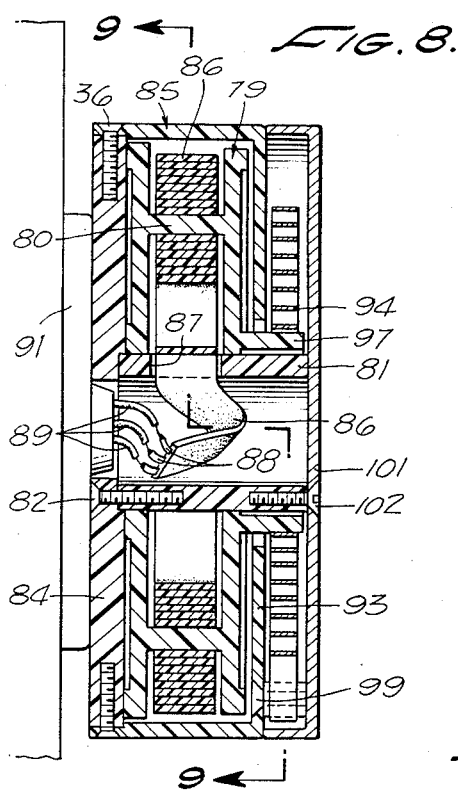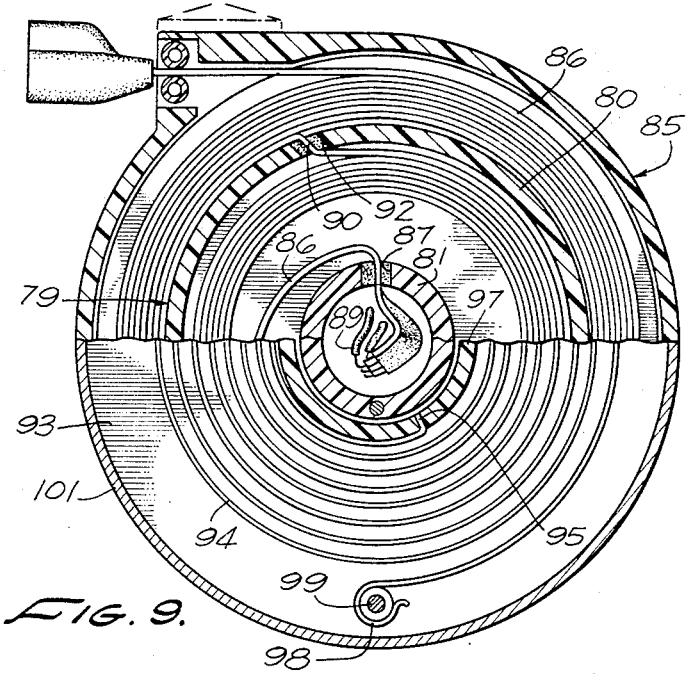

CABLE RETRACTOR

This invention relates to cable retractors and more particularly to a novel arrangement for storing an electrical cable on a reel rotatably mounted on a stationary drum which enables the inner end of the cable to remain fixed to the drum while the outer portion of the cable is released from or taken up by the retractor.

When it is desired to move a portable electrical appliance or the like freely about from one place to another during the use thereof, the length of cable by which the appliance is connected to a source of electrical power must be made long enough to permit the appliance to be readily moved to its furthest point. Thus, any time the appliance is moved closer to its source of power, the slackened condition of the extra length of the cable if left free assumes a relatively uncontrollable position which, at times, can become quite cumbersome. The provision of a cable retractor having a reel on which the electrical cable can be wound such that it can be readily played out or gathered in so as to eliminate any slack in the cable between the appliance and the source of power is, therefore, very desirable.

The problem with constructing a cable retractor having such a reel is the difficulty of simply establishing and maintaining an electrical circuit connection for the inner end of the cable during the winding and unwinding thereof. The circuit connection can be made by providing brushes and slip rings on the reel and mount therefor but such a construction is not only objectionable from the viewpoint of requiring special maintenance of the brushes to provide a suitable electrical contact of the rings with a minimum of friction but is also expensive to manufacture especially when the cable comprises a number of conductors.

Accordingly, one of the objects of the present invention is to provide an improved simplified reel arrangement for playing out or gathering in an electrical cable while permitting the inner end of the conductors comprising the cable to be attached to terminals of a power source.

Another object of the invention is to provide a reel arrangement for a cable retractor which avoids the need for providing brushes and slip rings on the reel and the mount therefor in order for the inner ends of the respective conductors comprising the cable to have a circuit connection to a source of power.

Still another object of the invention is to provide for attaching and winding a length of cable on a reel rotatably mounted on a stationary drum such that the inner end of the cable at all times remains fixed to the stationary drum while the outer portion of the cable is being gathered up by or being released from the reel.

With these and other objects in view the invention consists of the construction, arrangement and combination of the various parts of the device whereby the objects contemplated are obtained as herein set forth, pointed out in the appended claims and illustrated in the acompanying drawings.

IN THE DRAWINGS:

FIG. 1 is a perspective, exploded view showing the components which form the electrical cable retractor of the present invention;

FIG. 2 is a perspective view of the assembled electrical cable retractor;

FIG. 3 is a vertical, sectional view of the electrical cable retractor as taken along the line 3—3 of FIG. 2;

FIG. 4 is a transverse, sectional view of the electrical cable retractor as taken along line 4—4 of FIG. 3 showing the cable fully retracted onto the storage reel;

FIG. 5 is a partially sectional view of the electrical cable retractor as taken substantially along line 5—5 of FIG. 3;

FIG. 6 is a transverse, sectional view of the electrical cable retractor, similar to FIG. 4, but showing the cable fully withdrawn from the storage reel;

FIG. 7 is a perspective view showing a portion of a flat multiconductor cable used in the electrical cable retractor of the present invention;

FIG. 8 is a vertical, sectional view, similar to FIG. 3, but showing another embodiment of the electrical cable retractor of the present invention; and FIG. 9 is a transverse, sectional view of the electrical cable retractor of FIG. 8 as taken substantially along line 9—9 therein.

Referring to the drawings, the cable retractor 10 of the present invention includes a storage reel 11 having spaced, circular, side walls 15 and 16 each of which has a central opening 13 therethrough. The side walls 15 and 16 are interconnected by a cylindrical wall 18 which is radially disposed intermediate the outer periphery and the central opening 13 of the circular side walls. The reel 11 is made of plastic or other material. The outer surface of the cylindrical wall 18 and the outwardly extending portions of the circular side walls 15 and 16 form an outer channel on the reel 11 for storing the successive turns of an outer portion of a length of flat cable 20 which is to be withdrawn from the reel 11. The inner surface of the cylindrical wall 18 and the inwardly extending portions of the circular side walls 15 and 16 form an inner channel on the reel for storing the successive turns of an inner portion of the length of flat cable 20 which portion remains within the reel 11 when the outer portion of the length of cable 20 is withdrawn therefrom.

A cylindrical, hollow drum 14 is positioned in the central openings 13 on the circular side walls of reel 11 with a shoulder 21 formed on one end thereof abutting up against the side wall 16. The other end of drum 14 fits in an annular groove 24 provided about a central opening 25 in a circular end cover 28. The drum 14 is anchored to the end cover 28 by screws 29 passing through holes 30 in the end cover 28 and threading into threaded holes 32 formed in the end of the cylindrical wall of the drum 14. It should be noted that the surfaces of the central openings 13 in the side walls of the reel 11 bear on the cylindrical surface of drum 14 such that the reel 11 is rotatably mounted thereon.

A cylindrical casing 34 made of metal or plastic material and formed with an integral end wall 35 encloses the reel 11 and fits over the end cover 28. The casing 34 is connected to the periphery of the end cover 28 by screws 36 passing through holes 38 therein and threading into threaded holes 39 formed on the periphery of the end cover 28. As shown in FIGS. 3 and 5, a long running negator motor 42 is enclosed within a motor housing 43 which is attached to the end wall 35 of casing 34 by screws 46 passing through holes 47 in ears 48 provided on the sides of motor housing 43. Motor housing 43 is provided with an outer cover 45. The negator motor 42 includes a flat spring 49 having one end thereof attached to and normally wound with a plurality of turns about a storage cylindrical member 50 having an axial shaft 51 rotatably supported in the motor housing 43. The other end of the spring 49 extends from the cylindrical member 50 and is attached to an output cylindrical member 53 having an axial shaft 54 rotatably supported in the motor housing 43. A pinion 56 attached to the inner end of the shaft 54 meshes with the teeth of an annular gear 58 formed on the inner circular surface of a ring extension 60 provided on the side wall 16 of reel 11.

The cylindrical wall of casing 34 is provided with a tangential projection 61 having a face 62 with a passageway 63 therein in which a pair of freely rotating rollers 64 are mounted. An arresting device 65 is provided on the flat top 66 of projection 61. As shown in FIG. 5, the arresting device 65 includes a push button 70 having a wedging member 67 on the lower end thereof which is fitted to be slidably movable within a slot 69 formed on the top of projection 61. By exerting a force on the push button 70 the member 67 can be wedged between the inner surface of the casing 34 and the top of the side wall 16 of the reel 11 to thus enable the reel 11 to be locked in position within the casing 34.

It should now be clear that the reel 11 is rotatably mounted within the casing 34 on the drum 14 which is attached to the end cover 28 of the casing 34. The drum 14 is thus held in a stationary position in the casing 34 at all times while the reel 11 can be rotated within the casing 34 in either a clockwise or counterclockwise direction relative to the drum 14.

Next to be described is the manner in which a single length of the flat cable 20 is attached to and wound on the reel 11 and drum 14 of the cable retractor 10 so as to enable an outer portion of the length of cable to be withdrawn from the reel 11 or retracted onto the reel 11 while permitting the inner end of the length of cable 20 to be secured at all times to the stationary drum 14. It should be noted, as shown in FIG. 7, that cable 20 is in the form of a thin tape of insulating material with three spaced conductors 23 embedded therein. The flat cable 20 is made of a material that has a natural tendency to straighten out when wound about a curved surface.

FIG. 4 is a transverse sectional view of the cable retractor 10 showing the reel 11 mounted on the drum 14 and showing the manner in which the single length of flat cable 20 is wound on the reel 11 when the cable 20 is fully retracted within the casing 34 of the cable retractor 10. A point 71 or the single length of flat cable 20 divides the length of the cable into an outer portion which comprises a little more than one half of the overall length of the cable and an inner portion which comprises the remainder of the overall length of the cable. The length of cable 20 extends through a slot 72 on the cylindrical wall 18 with the point 71 thereof secured in the slot 72 by potting compound, for example, as shown.

Referring to the transverse view of the cable retractor as shown in FIG. 4, and starting from slot 72 in the cylindrical wall 18 of the reel, the outer portion of the cable 20 is wound in a counterclockwise direction about the outer surface of the cylindrical wall 18 so as to form a plurality of turns before the outer end of the cable 20 is directed through the tangential projection 61 on the casing 34 and between the rollers 64 to the exterior of the cable retractor 10. A female plug 70a is connected to the outer end of the cable 20. As shown in FIG. 4, the inner portion of the cable 20 extending inwardly from the slot 72 in the cylindrical wall 18 of the reel 11 continues in the same direction as the formation of the adjacent turn of the cable provided on the outer surface of the cylindrical wall 18, except that now it follows the inner surface of the cylindrical wall 18 to form a plurality of turns there about, after which the inner end of the cable spirally extends inwardly to pass through a slot 74 in the drum 14 in which the point 73 of the cable 20 is secured by a potting compound, for example, as shown. A male connector 76 is attached by screws 78 to the end cover 28 such that its terminal 75 extends through the central opening 25 of the end cover 28. The inner end of the cable 20 positioned within the drum 14 has its spaced conductors 23 respectively attached to the terminals 75 of male connector 76.

It should now be clear that when the flat cable 20 is gathered within the reel 11 as shown in FIG. 4, the outer portion of the length of flat cable 20 is wound about the outer surface of cylindrical wall 18 of the reel 11 and the inner portion of the length of flat cable 20 is wound about the inner surface of the cylindrical wall 18. Furthermore, when the inner portion of the cable 20 is so wound along the inner surface of cylindrical wall 18 a space is left between its last turn thereon and the cylindrical surface of the drum 14 to which the free inner end of the flat cable 20 is attached.

Referring to FIGS. 4 and 6, as the flat cable 20 starts to withdraw from the reel 11, the reel rotates in a counterclockwise direction to play out the outer portion of the length of cable 20. As the reel 11 rotates it carries with it the inner turns of the cable 20 but as it proceeds to rotate relative to stationary drum 14 the innermost turn of the inner portion of the length of cable leaves its position near the cylindrical wall 18 and winds around the stationary drum 14. It should be noted that the natural tendency of the flat cable 20 to straighten out serves to maintain its turns in position along the inner surface of the cylindrical wall 18 until transferred by the rotation of the reel 11 about the drum 14. It is thus seen that the action of transferring the inner portion of the cable 20 to the stationary drum 14 continues so that when the outer portion of cable 20 is completely withdrawn from the outer surface of cylindrical wall 18 of reel 11, as shown in FIG. 6, the inner turns of the cable 20 are all unwound from the inner surface of the cylindrical wall 18 and are now wound about the stationary drum 14.

As the flat cable 20 is withdrawn from the casing 34, the reel 11 rotates in a counterclockwise direction as viewed in FIG. 4, and as it rotates, the annular gear 58 formed on the outer rim extension 60 thereof drives the pinion 56 on the end of shaft 54 of negator motor 42 so as to cause the spring 49 to unwind from its normally stable untensioned position on the storage cylindrical member 50 and wind on the output cylindrical member 53 of the negator motor 42. This build up of energy in the motor 42 urges the reel 11 to rotate in the clockwise direction about the stationary drum 14.

It should now be clear that a slight pulling force on the end of the cable 20 such as caused by the movement of a portable electrical appliance (not shown) attached to the female plug 70a on the outer end thereof will cause the cable 20 to be withdrawn from the cable retractor 10 and the negator motor 42 to be operated such that its spring 49 is in a tensioned condition. Thus, whenever the portable electrical appliance is moved closer to the cable retractor 10, the cable 20 will be retracted into retractor 10 due to the pull of the negator motor 42, thus eliminating any slack in the cable. Thus when the reel 11 is reversely rotated by the spring motor 42 relative to the stationary drum 14, the outer portion of the length of cable is again wound about the outer surface of the cylindrical wall 18 and the inner portion of the length of cable 20 is unwound from the drum 14 and, because of its natural tendency to straighten out, again wound about along the inner surface of the cylindrical wall 18.

It should be particularly noted that approximately a little less than one half of the length of the cable 20 is not available for being withdrawn from the cable retractor 10 of the present invention since it is being used to permit reel 11 to be rotated about the stationary drum 14 to enable the outer turns of the cable 20 to be played out of the retractor 10 while remaining a connection between the point 71 of the cable attached to the cylindrical wall 18 of the rotating reel 11 and the point 73 of the cable attached to the stationary takeup drum 14. However, the flat cable 20 is relatively inexpensive and the arrangement of the present invention for attaching and winding the cable 20 on the rotating reel 11 relative to the stationary drum 14 has the advantage that the inner ends of the conductors 23 embedded in the cable 20 can be permanently connected to the terminals 75 of the male connector 76 attached to the side wall 15 of the cable retractor 10 without the need for brushes or slip rings.

Another embodiment of the cable retractor of the present invention is shown in FIGS. 8 and 9. This embodiment has a different spring type motor drive for reel 79 rotatably mounted within casing 85. Thus, as shown in FIG. 8, which is similar to the showing in FIG. 3, the reel 79 having a cylindrical wall 80 which has its end attached by screws 82 to an end cover 84 of the casing 85 which encloses the reel 79. A length of flat cable 86 is wound about the cylindrical wall 80 of the reel 79 in a manner similar to that described for winding cable 20 about the cylindrical wall 18 of the reel 11 in the embodiment of the cable retractor shown in FIGS. 1-6. Thus, starting with the intermediate point 90 of the cable 86 secured in a slot 92 on the wall 80, the outer portion of the cable 86 is wound with a plurality of turns in a counterclockwise direction about the outer surface of the cylindrical wall 80 and the inner portion of the cable 86 is wound with a plurality of turns in the same direction about the inner surface of the wall 80. The inner end of the cable 86 then passes through a slot 87 in the stationary takeup drum 81 and secured thereat. The ends of conductors 88 embedded in the tape of insulating material forming flat cable 86 are thus able to be connected to terminals 89 of an electrical conductor 91 attached to the end cover 84 of the casing 85.

As shown in FIGS. 8 and 9, a motor in the form of a spiral spring 94 is positioned adjacent the integral end wall 93 of the casing 85 so as to surround the circular end of the takeup drum 81. The inner end 95 of the spiral spring 94 is anchored on an inner shoulder 97 of the reel 79 and the outer end 98 of the spiral spring 94 is anchored to the integral end wall 93 of the casing 85 by a pin 99. Thus, as the outer portion of the cable 86 is played out of the casing 85, the reel 79 with its cylindrical wall 80 is rotated counterclockwise and the spiral spring 94 tends to wind up storing energy so that when the cable 86 is slack, the spiral spring 94 serves to rotate the reel 79 in a clockwise direction about takeup drum 81, as viewed in FIG. 9, causing cable 86 to be retracted into the casing 85. A housing 101 for the spiral spring 94 is attached to the end of the takeup drum 81 by a screw 102.

While the invention has been concerned with a particular embodiment of the present invention, it is to be understood that many modifications and variations in the construction and arrangement thereof may be provided for without departing from the spirit and scope of the invention or sacrificing any of its advantages. The invention is therefore considered as including all such possible modifications and variations coming within the legitimate and valid scope of the claims.

We claim:
1. A cable retractor comprising:
   a stationary drum,
   a reel rotatably mounted on said drum,
   said reel having a cylindrical wall spaced radially outward from the surface of said drum and said cylindrical wall being provided with an axially disposed slot.
   a single length of cable in the form of a thin tape of resilient insulating material having a plurality of parallelly disposed conductors embedded therein, said length of cable extending through the slot on said cylindrical wall and anchored thereat to divide said length of cable into an outer portion which is wound with a plurality of turns about the outer surface of said cylindrical wall and an inner portion which is wound with a plurality of turns continuing in the same direction and tending to bear against the inner surface of said cylindrical wall, the inner end of said cable being attached to said drum, and
   a spring motor for reversely rotating said reel,
   whereby when the free end of the outer portion of said cable is withdrawn from said reel, said reel rotates relative to said drum to store energy in said spring motor and to cause the inner portion of said cable to be unwound from the inner surface of said cylindrical wall and wound about said drum, and
   whereby when the free end of the outer portion of said cable is slack said spring motor reversely rotates said reel relative to said drum to gather said outer portion of said cable on said reel and cause the inner portion of said cable to be unwound from said drum and wound about the inner surface of said cylindrical wall.

2. A cable retractor comprising:
   a stationary drum,
   a reel rotatably mounted on said drum and having a cylindrical wall spaced radially outwardly from the surface of said drum,
   said reel having an annular gear on the side thereof,
   a spring motor including a storage rotatable member having a spring normally wound thereon and an output rotatable member having the outer end of said spring attached to the periphery thereof,
   a pinion engaging said annular gear and connected to rotate with said output rotatable member,
   a casing enclosing said reel with the end of said drum being anchored to the side of said casing, and
   a length of cable having an outer portion thereof wound with a plurality of turns about the outer surface of said cylindrical wall and having an inner portion thereof wound with a plurality of turns about the inner surface of said cylindrical wall with the inner end of said cable being attached to said drum, whereby when the free end of the outer portion of said cable is withdrawn from said casing, said reel rotates relative to said drum to cause the inner portion of said cable to be unwound from the inner surface of said cylindrical wall and wound about said drum, and whereby when the free end of the outer portion of said cable is slack said spring motor reversely rotates said reel relative to said drum to gather up the outer portion of said cable and cause the inner portion of said cable to be unwound from said drum and wound about the inner surface of said cylindrical wall.

3. The invention in accordance with claim 2 wherein said casing is provided with a passageway, and a pair of rollers mounted within said passageway between which the outer portion of the length of cable travels as it is being withdrawn from or retracted into said casing.

4. The invention in accordance with claim 2 including means on said casing capable of being adjustably positioned to arrest the rotational motion of said reel.

5. A cable retractor comprising:

a base means, a reel rotatably mounted on said base means, said reel having an annular gear on the side thereof, a spring motor including a coil spring, a storage rotatable member and an output rotatable member, said coil spring normally wound on said storage rotatable member with the outer end of said coil spring attached to the periphery of said output rotatable member, a pinion engaging said annular gear and connected to rotate with said output rotatable member, a first annular channel on said reel, an outer length of cable wound with a plurality of turns in said first annular channel, a second annular channel on said reel, an inner length of cable in the form of a flat tape of insulating material having an inherent tendency to straighten out when not constrained, said inner length of cable loosely wound with a plurality of turns in said second annular channel, said inner length of cable having one end connected to said base means and its other end connected to the inner end of said outer length of cable so as to form a continuous conductor extending from said base means to the free end of said outer length of cable, whereby as the free end of said outer length of cable is withdrawn from the first annular channel on said reel, said reel rotates relative to said base means to cause the spring coil of said spring motor to be wound about said output rotatable member and said inner length of cable to become more tightly wound in the second annular channel of said reel, and whereby as the free end of said outer length of cable is slackened said spring motor reversely rotates said reel relative to said base means to gather up said outer length of cable in the first annular channel and cause said inner length of cable to become more loosely wound in the second annular channel of said reel.

6. An automatic cable retractor comprising:

base means providing a fixed connection to an outside source, a reel rotatably mounted on said base means, said reel having axially spaced radially extending annular flanges and having a cylindrical wall located intermediate the inner and outer peripheries of said annular flanges, said cylindrical wall being provided with an axially disposed slot therein, a spring motor adapted when strained to reversely rotate said reel, a length of cable in the form of a plurality of parallel conductors embedded in a flat insulating material, said length of cable passing through the slot on said cylindrical wall and anchored thereat with the outer portion thereof wound with a plurality of turns in a given hand about the outer surface of said cylindrical wall and with the inner portion thereof wound with a plurality of turns continuing in the same hand about the inner surface of said cylindrical wall, and the inner end of said length of cable being connected to said base means and the outer end of said length of cable being the free end thereof which is capable of being played out tangentially from the periphery of said reel.

7. The invention in accordance with claim 6 wherein the flat insulating material used to form said cable inherently has a tendency to straighten out so that when the inner portion of the length of cable is wound about the inner surface of said cylindrical wall its turns tend to be maintained close to said inner surface.

* * * * *